United States Patent
Sato et al.

(10) Patent No.: US 6,173,561 B1
(45) Date of Patent: Jan. 16, 2001

(54) STEAM COOLING METHOD FOR GAS TURBINE COMBUSTOR AND APPARATUS THEREFOR

(75) Inventors: Minoru Sato; Yuichi Kobayashi, both of Miyagi; Kouichi Akagi; Mitsuru Inada, both of Hyogo-ken, all of (JP)

(73) Assignees: Tohoku Electric Power Co., Inc., Miyagi; Mitsubishi Heavy Industries, Ltd., Tokyo, both of (JP)

( * ) Notice: Under 35 U.S.C. 154(b), the term of this patent shall be extended for 0 days.

(21) Appl. No.: 09/155,938
(22) PCT Filed: Feb. 12, 1998
(86) PCT No.: PCT/JP98/00553
  § 371 Date: Apr. 29, 1999
  § 102(e) Date: Apr. 29, 1999
(87) PCT Pub. No.: WO98/36221
  PCT Pub. Date: Aug. 20, 1998

(30) Foreign Application Priority Data

Feb. 12, 1997 (JP) .................................................. 9-027706

(51) Int. Cl.$^7$ ................................. F23R 3/42; F02C 7/18
(52) U.S. Cl. ............................ 60/39.02; 60/752; 60/757; 60/760
(58) Field of Search ........................... 60/730, 752, 757, 60/760, 266, 267, 39.182, 39.02

(56) References Cited

U.S. PATENT DOCUMENTS 5,802,841  9/1998  Maeda ................................. 60/39.07

5,906,093 * 5/1999 Coslow et al. .......................... 60/752

FOREIGN PATENT DOCUMENTS

| 5-44494 | * 2/1993 | (JP) . |
| 9-209778 | 8/1997 | (JP) . |
| WO 97/14875 | 4/1997 | (WO) . |

* cited by examiner

Primary Examiner—Ted Kim
(74) Attorney, Agent, or Firm—Evenson, McKeown, Edwards & Lenahan, P.L.L.C.

(57) ABSTRACT

This invention concerns the use of pressurized steam as the cooling medium for a gas turbine combustor. It is distinguished by the following. Steam supply manifolds or ports for the cooling steam are provided on the gas inlet and outlet sides of the combustion chamber in the gas turbine combustor. A steam exhaust manifold or port for the cooling steam is provided between the gas inlet and outlet sides, in approximately the center of the chamber. Cooling channels for the steam are created in the external wall panel of the chamber between the steam supply manifolds and the exhaust manifold. The steam supplied into the wall panel through the steam supply manifolds on the gas inlet and outlet sides of the chamber is exhausted to the exterior via the steam exhaust manifold in the center of the chamber. This design allows pressurized steam with a high thermal capacity to be used to effectively cool the wall panels of the combustor, which are exposed to extremely hot combustion gases.

3 Claims, 5 Drawing Sheets

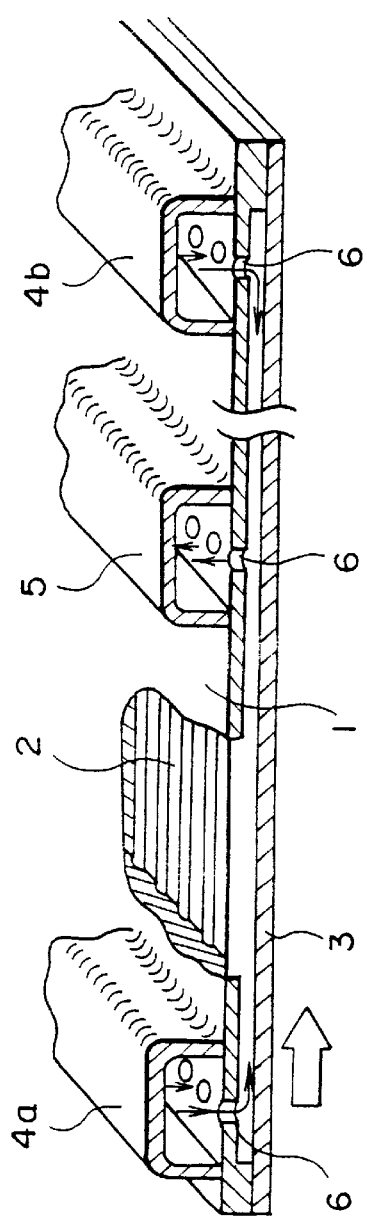
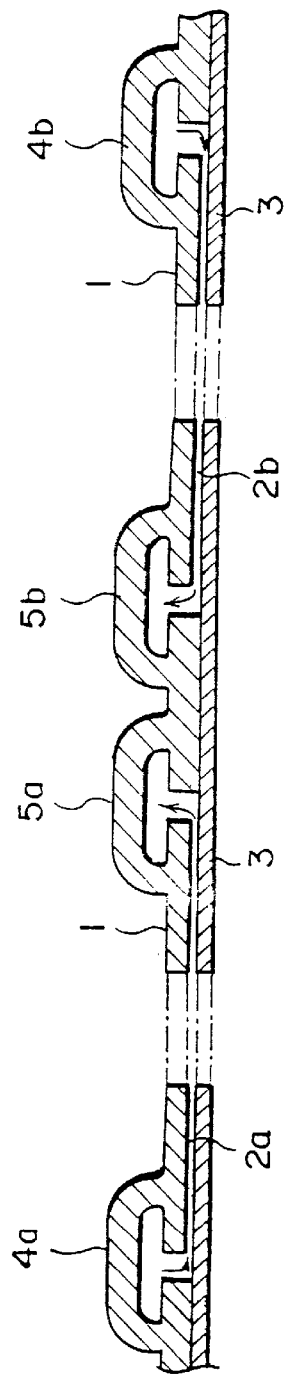
FIG. 2A
FIG. 2B

STEAM COOLING METHOD FOR GAS TURBINE COMBUSTOR AND APPARATUS THEREFOR

This application is a 371 of PCT/JP98/00553 filed Feb. 12, 1998.

INDUSTRIAL FIELD

This invention concerns a method and a device for steam-cooling the combustor of a gas turbine. More specifically, it concerns a method and device for steam-cooling the gas combustor wall, which is exposed to very hot combustion gases.

TECHNICAL BACKGROUND

One effective way to improve the thermal efficiency of a gas turbine is to boost the temperature at the gas inlet of the turbine. It is also desirable to suppress increased emission of $NO_x$ from the combustor that supplies combustion gases to the turbine and to improve the heat resistance of the turbine and its cooling capacity.

Since the combustor is exposed to temperatures of 1500 to 2000° C., it must be properly cooled so that the temperature of its wall panels remains in the allowable range as it experiences thermal stress.

Generally, combustors in gas turbines are cooled by running the air to be used for combustion along their inner wall panels, and by forcing air inside these wall panels in order to cool the metal components so that their temperature is lower than that of the combustion gases.

However, if air is used to cool the turbine, the air used for cooling and the air that leaks out of the cooling channels is released into the main gas flow. This air makes it more difficult to improve the capacity of the gas turbine and decrease the emission of $NO_x$.

This has led to proposals to use steam instead of air as the cooling medium.

In the past few years, combined power plants have received a great deal of publicity. These power plants make use of both gas and steam turbines in order to increase their generating efficiency (i.e., their thermal efficiency). A schematic diagram of a combined power plant is shown in FIG. 5. The gas turbine generating system comprises generator 40, compressor 41, combustor 42 and gas turbine 43. A steam turbine generating system, which comprises boiler 45, steam turbine 46, on whose output shaft 46a generator 40 is mounted, and steam condenser 47, is installed on the gas turbine. The exhaust gases from the gas turbine 43 are fed into boiler 45. The boiler water supplied from steam condenser 47 is heated and vaporized, and this steam is used as the drive source for steam turbine 46.

In this sort of combined power plant, there is an abundant supply of steam, which can easily be tapped, and steam has a higher thermal capacity to transmit heat than air does. Recently, engineers have been studying the use of steam instead of air as a cooling medium for the parts of the turbine, which experience high temperatures. However, if the steam that has been used to cool the hot portions of the turbine in a combined power plant is released into the main gas flow, the temperature of the flow will drop, and the thermal efficiency of the turbine will decrease. For this reason it has been suggested that the steam used for cooling should be entirely recovered and used as drive steam for the steam turbine.

FIG. 5 illustrates how this method of steam cooling would work. As indicated by the dotted lines in the drawing, the steam generated in waste heat recovery boiler 45 is extracted and conducted to the hot portions of the combustor or other areas of the turbine which need to be cooled. All the steam used for cooling is then recovered and used as drive steam for steam turbine 46. This method enables a gas turbine 43 to be realized with a temperature at its gas inlet port in excess of 1500° C., and it also improves the overall efficiency of the combined power plant.

Although the use of steam instead of air as the cooling medium in the combustor of a gas turbine has been given a great deal of consideration, it is still at the conceptual level and has not yet been put into practice.

Existing techniques for cooling the wall panels of a combustor used in a high-temperature turbine all employ cooling air, which has a low thermal capacity and low pressure. The existing configurations are thus unsuitable for steam-cooling, which entails high thermal capacity and high pressure; but this is what would be needed to effectively cool the combustor of a gas turbine, whose wall panels are exposed to extremely hot exhaust gases.

SUMMARY OF THE INVENTION

In view of this background and in response to the need for further refinement of the technology, the object of this invention is to provide a design suitable for realizing a steam cooling system.

More specifically, the object of this invention is to provide a cooling method and device for steam-cooling the combustor of a gas turbine. Pressurized steam having a high thermal capacity is used to effectively cool the wall panels of the combustor, which are exposed to extremely hot combustion gases.

Another object of this invention is to provide a simple configuration for steam-cooling that could use pressurized steam as a cooling medium for the combustor of a gas turbine. Such a configuration would entail a strong cooling channel for cooling medium and a supplying and recovery means to supply steam to and recover steam from the vicinity of the combustor, and it would not permit the steam to leak out of the system. This configuration would have a simple design and would accomplish these objects easily.

To achieve the objects outlined above, the invention is designed as follows. This is a cooling method for steam-cooling the combustor of a gas turbine using pressurized steam as the cooling medium. This method is distinguished by the fact that the steam used for cooling, which is supplied to the wall of the combustion chamber from both the gas inlet and outlet sides of the combustor, is exhausted to the exterior from the center of the chamber through a steam exhaust port located between the gas inlet and outlet sides of the chamber.

This cooling system is configured as follows. Steam supply ports are provided on the combustion chamber at the gas inlet and outlet sides of the combustion chamber of the combustor, there through steam is supplied. A steam exhaust port is provided in the center of the combustion chamber between the gas inlet and outlet sides. Steam channels for the steam are provided inside the wall panels of the combustion chamber between the steam supply port and the steam exhaust port. Preferably, these steam channels comprise temperature-resistant plates soldered to the surfaces of a number of grooves provided in the wall panels of the chamber.

With this invention, pressurized steam is used to cool the combustor of a gas turbine. This steam, which is supplied to the interior of the wall panels via steam supply ports on both the gas inlet and outlet sides of the combustor, is exhausted to the exterior via steam exhaust port in the center of the chamber. This design allows the use of pressurized steam with a high thermal capacity to effectively cool the wall panels of the combustor, which are exposed to extremely hot combustion gases.

How the invention works will now be explained with reference to FIG. 3.

The locations along the axial direction from the gas inlet side A to the gas outlet side B of combustion chamber 50 are shown on the horizontal axis; the temperature of the gases at each location is plotted on the vertical axis. This allows the temperature variations within the chamber to be observed.

The distribution of incident heat indicates the quantity of heat from the combustion gases that strikes the combustor wall of the combustion chamber (the "steam-cooled combustor wall" in the embodiments to be discussed shortly). The temperature peaks on the gas inlet side A of the chamber. It falls across the center C of the chamber and climbs again on the gas outlet side B.

The thermal conductivity, which is shown by a broken line in the graph, indicates the rate at which a quantity of heat is conducted from the combustion gases to the combustor wall of the chamber. The conductivity, too, is highest at gas inlet side A of chamber 50. It falls toward the center C of the chamber and rises again on the opposite side.

The temperature distribution of the combustion gases in chamber 50 shows a sharp rise on gas inlet side A and a more gradual rise across center C toward gas outlet side B.

Considering combustion chamber 50, then, it can be seen that there are high-temperature regions on gas inlet side A and gas outlet side B, while the temperature is relatively low in center region C. If steam supply ports 4a and 4b are provided to supply the steam to sides A and B where the temperature is high, and the cooling capacity of the steam is employed in sufficient stages, adequate cooling can be expected to occur.

The quantity of incident heat from the combustion gases is higher than the temperature of the gases or the thermal conductivity on side A of combustion chamber 50. The quantity of incident heat is also great on gas outlet side B. The most effective plan, then, would be to aim steam supply ports 4a and 4b at these locations.

BRIEF DESCRIPTION OF THE DRAWINGS

FIG. 2(A) shows a cross section of a steam-cooled wall in the combustor of a gas turbine, which is the first preferred embodiment of this invention as shown in FIG. 1. The perspective drawing shows the cooling channels that conduct the steam from supply manifolds on the gas inlet and outlet sides of the chamber to the recovery manifold.

FIG. 2(B) shows a cross section of a steam-cooled wall in the combustor of another gas turbine, which is a second preferred embodiment of this invention. This cross section shows a steam-cooled wall panel on which two recovery manifolds are provided for the supply manifolds on the gas inlet and outlet sides of the chamber.

DESCRIPTION OF PREFERRED EMBODIMENTS

In this section a detailed explanation of several preferred embodiments of this invention is given with reference to the drawings. To the extent that the dimensions, materials, shape and relative position of the components described in this embodiment are not definitely fixed, the scope of the invention is not limited to those specified, which are meant to serve merely as illustrative examples.

Figure 1:
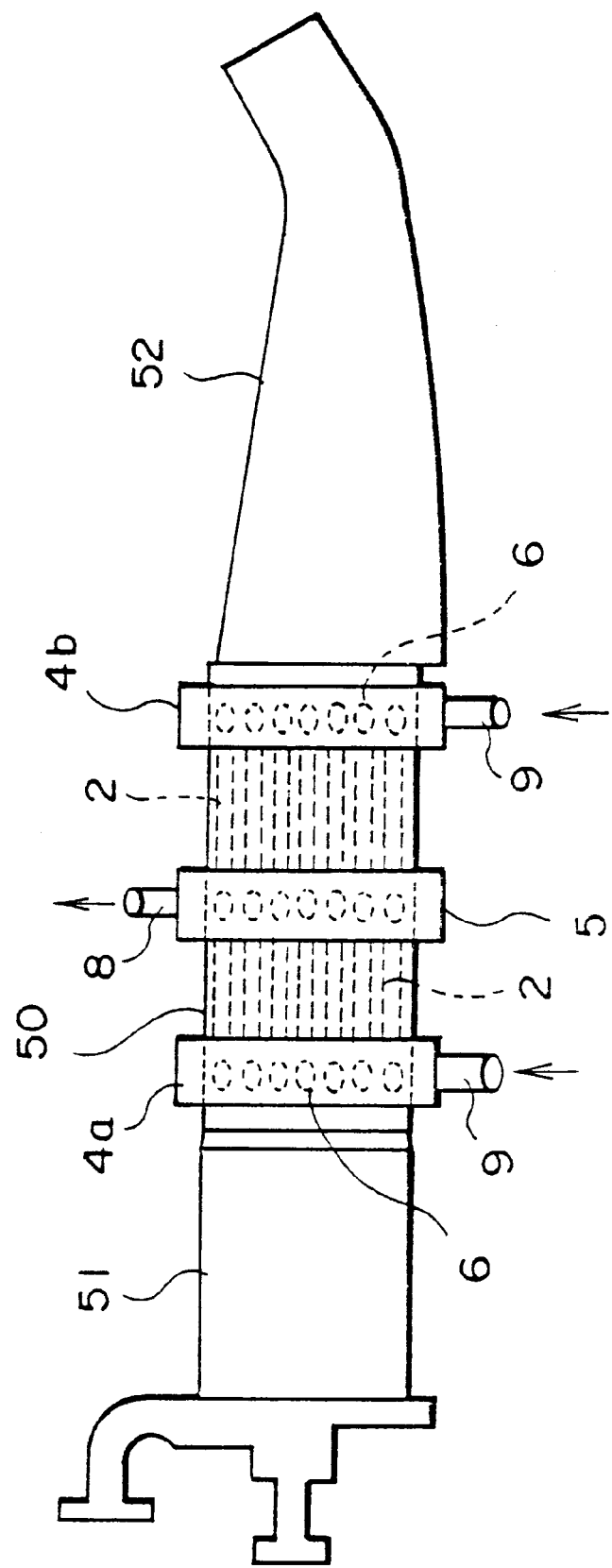
FIG. 1 is a sketch of a combustor of a gas turbine, which is a first preferred embodiment of this invention.
Figure 3:
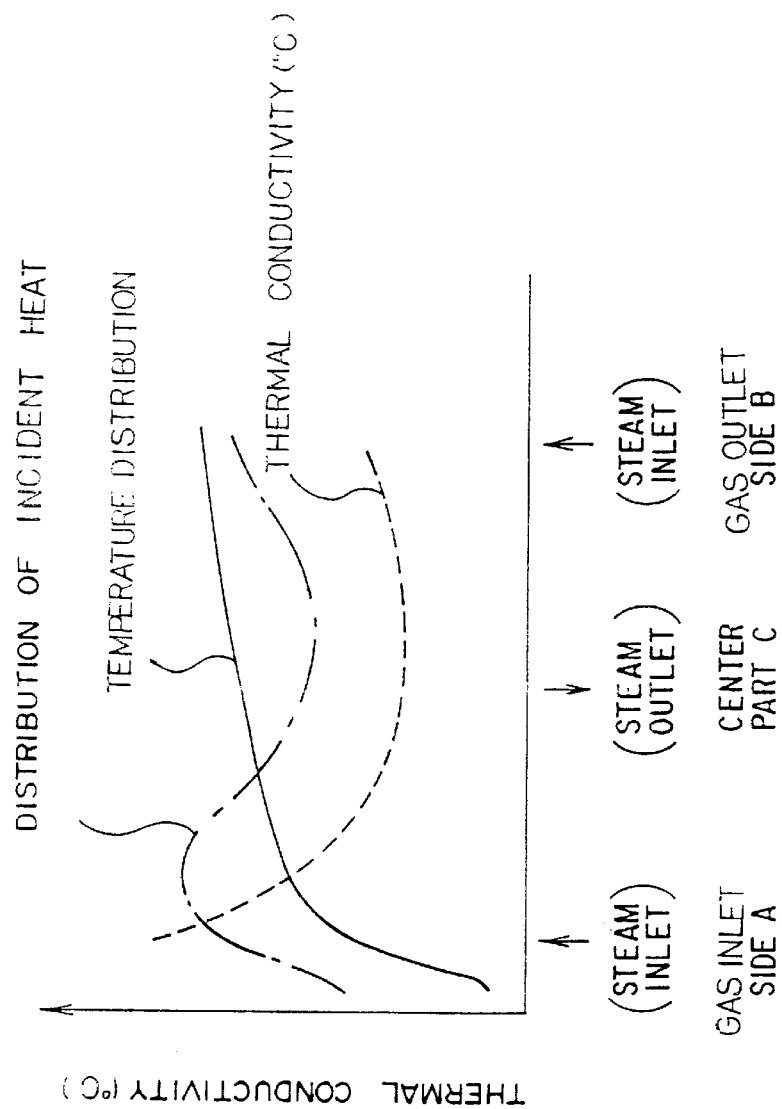
FIG. 3, which illustrates the premise underlying the invention, shows the distribution of three parameters in the axial direction from the gas inlet side to the gas outlet side of the combustion chamber. The line broken by single dashes shows the distribution of the quantity of heat from the combustion gases striking the combustor wall of the chamber. The dotted line is the thermal conductivity, the rate at which the quantity of heat from the combustion gases will be conducted to the wall of the chamber. The solid line is the temperature distribution of the combustion gases inside the chamber.

In a gas turbine plant, several combustors of the sort described earlier, with a combustion nozzle 51 on the gas inlet side of combustion chamber 50, as shown in FIG. 1, and a tailpipe 52 on the gas outlet side, are provided inside a cylindrical casing (not shown) which is pressurized using compressed air from a compressor. These combustors are arranged around the circumference of the casing. The combustion gases generated in the chamber 50 are conducted to the turbine via the tailpipe 52 and used to drive the turbine.

As can be seen in FIG. 1, the combustor which is a first preferred embodiment of this invention has on the peripheral surface of the combustion chamber 50 two annular supply manifolds, 4a and 4b, on the gas inlet and outlet sides of the chamber, respectively. These manifolds have a peripheral wall panel whose cross section is either semicircular or rectangular. Between the two supply manifolds, in the center of the chamber, is a recovery manifold 5 of the same design. As is shown in FIG. 2(B) as a second preferred embodiment, there may be more than one recovery manifold 5 between supply manifold 4a on the gas inlet side and supply manifold 4b on the gas outlet side. In this figure two recovery manifolds, 5a and 5b, are provided to correspond to the supply manifolds 4a and 4b. Cooling channels 2a and 2b run from the supply to the recovery manifolds.

Figure 5:
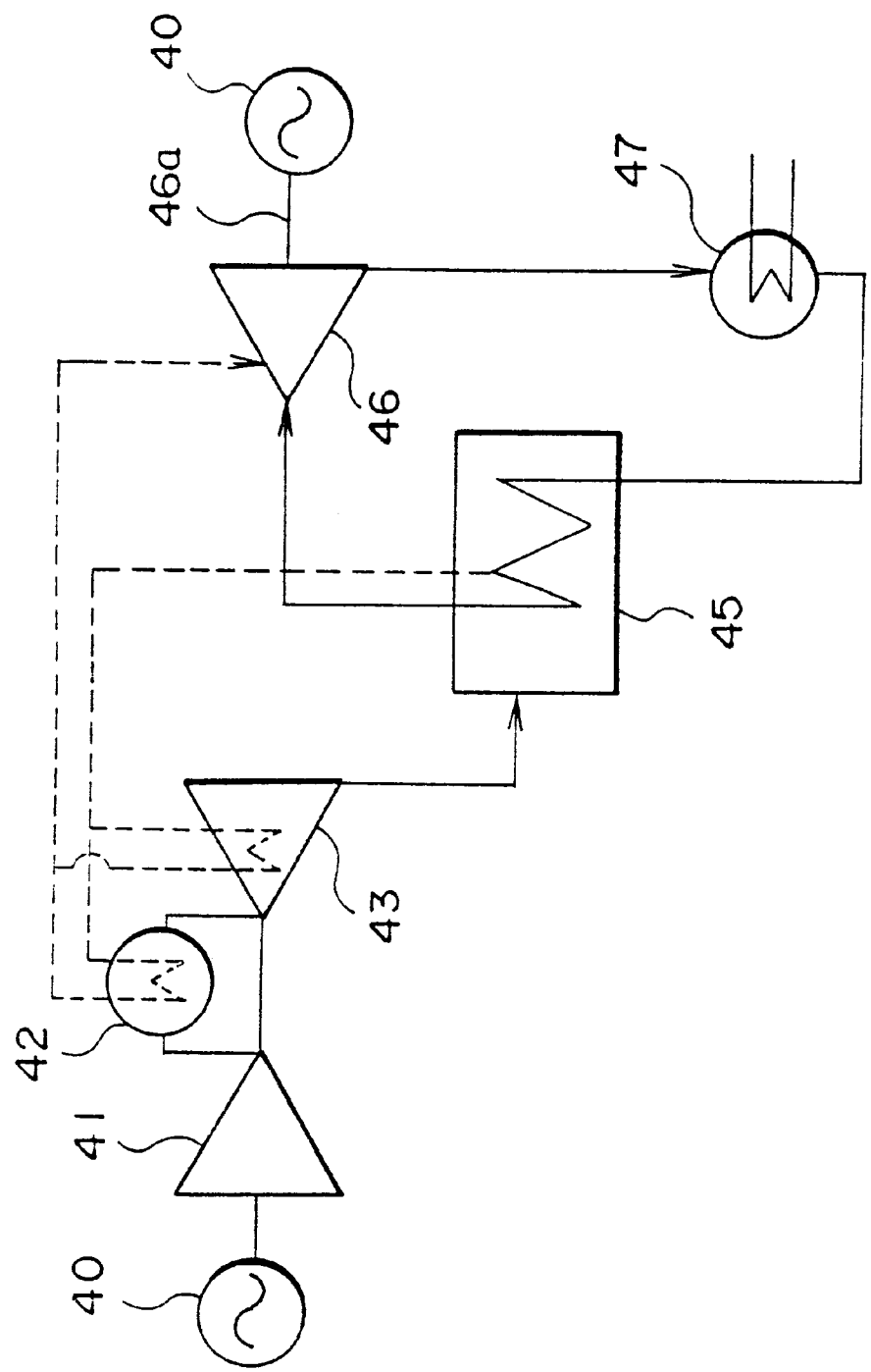
FIG. 5 shows how steam-cooling can be applied in a combined power plant in which a gas turbine is combined with a steam turbine.

To return to FIG. 1 and FIG. 5, the steam generated by waste heat recovery boiler 45 is used as the energy that drives steam turbine 46. On the other hand, this steam extracted by the said boiler 45 is then conducted via pipes 9 to supply manifolds 4a and 4b. Recovery manifold 5 recovers the steam after it passes through channels 2 and cools combustion chamber 50 and transports the recovered steam via recovery pipe 8 to the inlet of steam turbine 46.

A detailed explanation of the configuration of the cooling wall between the supply manifolds 4a and 4b and recovery manifold 5, will now be given with reference to FIG. 2(A). In exterior wall panel 1 of the wall of the combustor, a number of channels 2 for the cooling steam are laid out parallel to each other on the inner surface (the undersurface) of the wall panel. A separate, thin, heat-resistant plate 3 is soldered to the undersurface across which these channels run. The combustion gases, represented by the white arrow, flow under plate 3.

Numerous through holes 6 are provided on the surface of exterior wall panel 1 around the circumference of the chamber. These holes are in the locations where supply manifolds 4a and 4b are mounted at both ends of channels 2 (i.e., on the gas inlet and outlet sides of the chamber) and where recovery manifold 5 is mounted in the center of the chamber between the two supply manifolds. Through holes 6 may be arranged in a row, as is shown in FIG. 2(A), or they may be staggered to the left and right in a zigzag pattern.

Supply manifolds 4a and 4b are formed by attaching channel-shaped pieces to the external wall panel 1 in the locations that face the through holes 6. The steam to cool the chamber is supplied (as shown by the arrows in FIG. 1) via pipes 9, which feed into the channels in appropriate places, from a source such as recovery boiler 45 in parallel with gas turbine 43. This steam passes through holes 6 in the exterior wall panel 1 and is supplied to the cooling channels 2, which are between the external wall panel 1 and heat-resistant plate 3, as shown by the solid arrows in FIG. 2(A).

A detailed description of recovery manifold 5, which is configured identically to the supply manifolds 4a and 4b, will not be given.

Preferably exterior wall panel 1 and heat-resistant plate 3, which constitute the steam-cooled combustor wall, can be composed of Hastelloy X and Tomilloy (both are registered trademarks). Exterior wall panel 1 can be 3.0 to 5.0 mm thick, and heat-resistant plate 3, which is soldered to the external wall panel, should be 0.8 to 1.6 mm thick.

In this first embodiment, then, the combustor wall comprises two members (exterior wall panel 1 and heat-resistant plate 3) which have sealed cooling channels 2 running between them. These cooling channels 2 connect manifolds 4a and 4b, which supply the cooling steam, to recovery manifold 5. As the steam supplied via manifolds 4a and 4b travels through cooling channels 2 in exterior wall panel 1 from the gas inlet and outlet sides of the chamber, it cools the wall panels. The steam is then recovered through manifold 5 in the center of the chamber.

With this invention, as can be seen in FIG. 1, supply manifolds 4a and 4b are located, respectively, on gas inlet side A and gas outlet side B of the combustion chamber 50, the regions of the chamber with the highest temperatures. Recovery manifold 5 is located in the center C of the chamber, where the temperature is somewhat lower. This design allows the cooling capacity of the steam used as the cooling medium to be applied in sufficient stages to achieve effective cooling.

Figure 4:
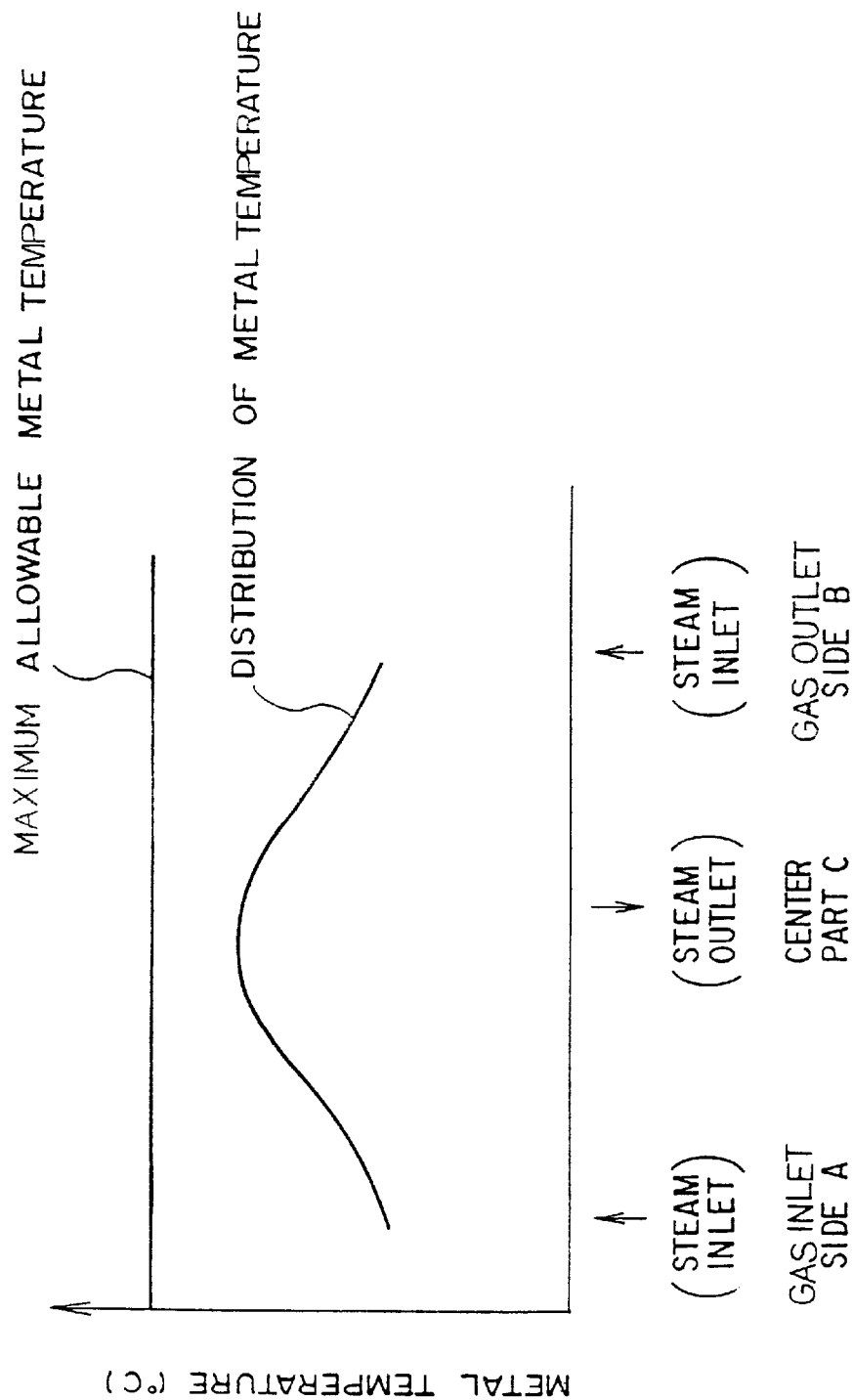
FIG. 4 shows the result of this invention. It is the distribution of the temperatures of metals in the chamber along the axial direction from the gas inlet side to the gas outlet side.

To test the effectiveness of this system, a series of experiments involving high-pressure combustion was performed using the embodiment discussed above. The results of these experiments confirmed the distribution of metal temperatures shown in FIG. 4.

Supplying steam of relatively low temperature and sufficient cooling capacity via manifolds 4a and 4b on gas inlet side A and gas outlet side B of the combustion chamber causes the temperature to drop on sides A and B. As the steam flows toward recovery manifold 5 in the center C of the chamber, its temperature rises, so the metals cooled by this steam clearly show the same pattern: they are cooler on sides A and B and hotter in center region C.

In this embodiment, therefore, supply manifolds (steam supply ports) 4a and 4b are placed in the regions of combustion chamber 50 most exposed to high temperatures, which are gas inlet side A, the region nearest the flames coming from combustion nozzle 51, and gas outlet side B, where the flow velocity of the combustion gases increases. The steam supplied via the manifolds (steam supply ports) 4a and 4b travels through channels 2 in the wall panel of chamber 50 and is collected via recovery manifold 5 in center region C.

In this embodiment, then, the cooling is initiated in the hottest regions of the chamber. This ensures that the heat can be exchanged effectively. And because the length of the cooling channels for the steam is short, the temperature of the steam exhausted through steam exhaust port 5 in center region C can be suppressed so that it does not rise more than is necessary.

FIG. 2(B) is a second preferred embodiment of this invention. The supply manifolds 4a and 4b are provided on the gas inlet and outlet sides of the chamber just as in the first embodiment. In the center of the chamber, however, there are two recovery manifolds, 5a and 5b, which correspond to the two supply manifolds. Between the supply and recovery manifolds are channels 2a and 2b.

In this embodiment, two independent cooling channels are provided. On the gas inlet side of the chamber are supply manifold 4a, channel 2a and recovery manifold 5a; on the gas outlet side are supply manifold 4b, channel 2b and recovery manifold 5b. This design allows the temperature of cooling to be controlled independently on the two sides of the chamber.

The two channels, 2a and 2b, can end separately in the center of the chamber as shown in the drawing, or they can be connected to each other so that they intercommunicate.

In the preceding, the present invention has been discussed using two preferred embodiments; however, the invention is not limited to these embodiments only. It should not be necessary to state that various modifications may be made to the actual configuration as long as it remains within the scope of the invention.

EFFECTS OF THE INVENTION

As has been discussed above, this invention improves the cooling of a combustor wall, mitigates the thermal stress it experiences and reduces the temperature of metals in the combustor. As a result, the temperature at the gas inlet port of the gas turbine can be raised, and the thermal efficiency of the turbine can be enhanced.

The greater heat resistance of the turbine allows the use of steam as a pressurized cooling medium. This improves the capacity of the gas turbine and reduces its emission of $NO_x$, thereby contributing to increased efficiency of the plant as a whole.

What is claimed is:

1. A steam-cooling method for cooling an exterior wall of a gas turbine combustor having a combustion chamber with combustion gas inlet and outlet sides, said method using pressurized cooling steam as a cooling medium and comprising the steps of:

supplying cooling steam into said exterior wall of said combustor at the combustion gas inlet and outlet sides of the combustion chamber of the combustor, and exhausting the cooling steam to an exterior from said wall of said combustor approximately centrally between said combustion gas inlet and outlet sides of said combustion chamber.

2. A steam-cooling structure for cooling an exterior wall of a gas turbine combustor having a combustion chamber with combustion gas inlet and outlet sides using pressurized cooling steam as a cooling medium, said structure comprising:

a pair of supply manifolds for supplying the cooling steam into said wall at the combustion gas inlet and outlet sides of the combustion chamber of said combustor;

at least one recovery manifold for recovering the cooling steam from said wall between said combustion gas inlet and outlet sides of said combustion chamber; and a plurality of cooling channels in said wall connecting said pair of supply manifolds and said at least one recovery manifold.

3. A steam-cooling gas turbine combustor having cooling channels according to claim 2, wherein said cooling channels are formed by attaching a plate to an exterior wall of said combustor over a plurality of cooling steam flow grooves or depressions formed in said exterior wall.

* * * * *